US012632524B2

(12) United States Patent
Ben Zvi et al.

(10) Patent No.: US 12,632,524 B2
(45) Date of Patent: May 19, 2026

(54) GENERATING CONFIGURATION RULES USING MACHINE LEARNING

(71) Applicant: Axonius Solutions Ltd., Tel-Aviv (IL)

(72) Inventors: Gil Ben Zvi, Hod HaSharon (IL); Oron Eliza, Tel Aviv (IL); Roee Salomon, Herzeliya (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

(21) Appl. No.: 18/915,464

(22) Filed: Oct. 15, 2024

(65) Prior Publication Data

US 2026/0105130 A1     Apr. 16, 2026

(51) Int. Cl.
*G06F 21/31* (2013.01)

(52) U.S. Cl.
CPC .................................... *G06F 21/31* (2013.01)

(58) Field of Classification Search
CPC ... G06F 21/577; G06F 21/31; H04L 63/0263; H04L 63/101
See application file for complete search history.

(56) References Cited

U.S. PATENT DOCUMENTS

| | | | | |
|---|---|---|---|---|
| 10,089,480 B1 * | 10/2018 | Wang | .................... | H04L 63/104 |
| 10,432,669 B1 * | 10/2019 | Badhwar | ............. | H04L 63/1408 |
| 10,867,044 B2 * | 12/2020 | Soby | ........................ | G06F 21/57 |
| 11,227,055 B1 * | 1/2022 | Badawy | ................ | G06F 21/604 |
| 11,399,214 B1 * | 7/2022 | Phillips | .............. | H04N 21/4665 |

| | | | | |
|---|---|---|---|---|
| 2009/0076865 A1 * | 3/2009 | Rousselle | .............. | G06Q 10/00 |
| | | | | 705/7.27 |
| 2015/0067889 A1 * | 3/2015 | Baikalov | ............... | G06F 21/577 |
| | | | | 726/28 |
| 2015/0356056 A1 * | 12/2015 | Matteson | ................ | G06F 17/18 |
| | | | | 708/607 |
| 2015/0373028 A1 * | 12/2015 | Baikalov | ................. | G06F 21/31 |
| | | | | 726/4 |
| 2016/0098654 A1 * | 4/2016 | Bhattacharjee | .. | G06Q 10/06395 |
| | | | | 705/7.36 |
| 2018/0332069 A1 * | 11/2018 | Moore | .................. | G06F 21/105 |
| 2019/0258648 A1 * | 8/2019 | Bhide | .................... | G06N 5/046 |
| 2019/0334928 A1 * | 10/2019 | Sela | ...................... | H04L 63/102 |
| 2019/0370468 A1 * | 12/2019 | Soby | ....................... | G06F 21/57 |
| 2020/0059476 A1 * | 2/2020 | Anderson | ........... | G06F 16/2237 |
| 2020/0106781 A1 * | 4/2020 | Li | ........................... | G06F 17/15 |
| 2020/0112590 A1 * | 4/2020 | Bhatia | ................... | G06N 3/042 |

(Continued)

OTHER PUBLICATIONS

L. Karimi and J. Joshi, "An Unsupervised Learning Based Approach for Mining Attribute Based Access Control Policies," 2018 IEEE International Conference on Big Data (Big Data), Seattle, WA, USA, 2018, pp. 1427-1436. (Year: 2018).*

(Continued)

*Primary Examiner* — Kari L Schmidt

(57) ABSTRACT

A system and method for access control in a computerize system comprise generating configuration rules using machine learning. Configuration data of a computerized system is organized into matrices representing entity attributes and entitlements, and is used to train a machine-learning model to generate configuration rules. The model predicts entity entitlement probabilities based on entity attributes. The generated rules include quality metrics and can be used to configure access control for new or existing entities in the system.

14 Claims, 6 Drawing Sheets

(56) References Cited

U.S. PATENT DOCUMENTS

| | | | |
|---|---|---|---|
| 2020/0304599 A1* | 9/2020 | Kanso | G06F 8/36 |
| 2020/0349467 A1* | 11/2020 | Teague | G06F 16/278 |
| 2021/0142209 A1* | 5/2021 | Patil | H04L 63/20 |
| 2022/0269862 A1* | 8/2022 | Li | G06N 3/042 |
| 2023/0114226 A1* | 4/2023 | Gauldin | G06Q 10/063112 |
| | | | 705/7.14 |
| 2023/0164023 A1* | 5/2023 | Chauhan | G06F 18/24147 |
| | | | 709/224 |
| 2023/0259647 A1* | 8/2023 | Yip | H04L 63/102 |
| | | | 726/28 |
| 2024/0028945 A1* | 1/2024 | Yadgaran | G06N 20/20 |
| 2024/0211957 A1* | 6/2024 | Robinson | G06Q 10/10 |
| 2024/0356799 A1* | 10/2024 | Connor | H04L 41/085 |
| 2024/0427323 A1* | 12/2024 | Velaga | G05B 23/0227 |
| 2025/0265329 A1* | 8/2025 | Rotenberg | G06F 21/46 |
| 2025/0384341 A1* | 12/2025 | Cella | G06N 20/00 |

OTHER PUBLICATIONS

R. Choudhary and H. K. Gianey, "Comprehensive Review on Supervised Machine Learning Algorithms," 2017 International Conference on Machine Learning and Data Science (MLDS), Noida, India, 2017, pp. 37-43. (Year: 2017).*

S. Arora, P. Khare and S. Gupta, "A Machine Learning for Role Based Access Control: Optimizing Role Management and Permission Management," 2024 First International Conference on Pioneering Developments in Computer Science & Digital Technologies (IC2SDT), Delhi, India, 2024, pp. 158-163. (Year: 2024).*

\* cited by examiner

200

201
Prepare digital data

210
Provide digital data to a machine-learning model

220
Compute one or more rule metric values

225
Add to each rule one or more rule metric values

230
Apply one or more configuration rules to other digital data

240
Control access to the computerized system by modifying one or more system configuration values

300

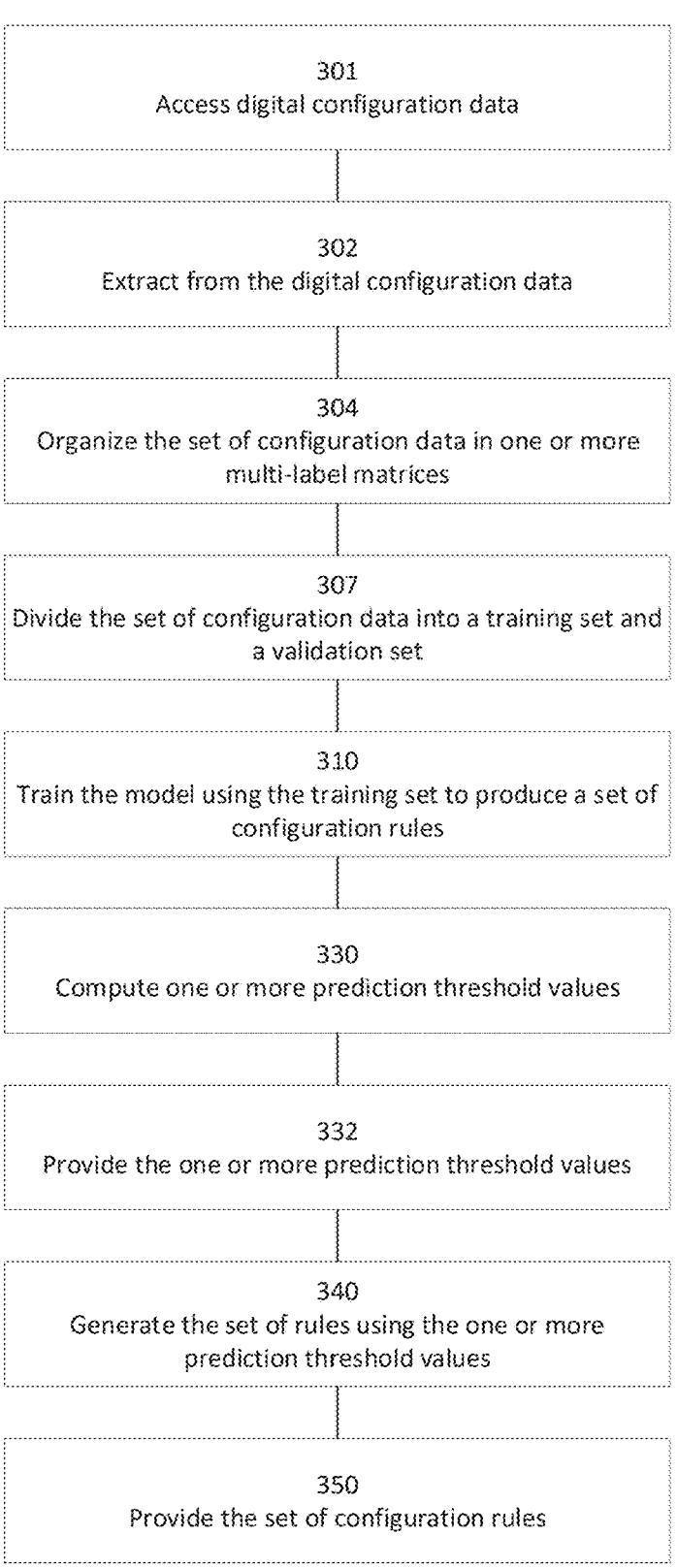

301
Access digital configuration data

302
Extract from the digital configuration data

304
Organize the set of configuration data in one or more multi-label matrices

307
Divide the set of configuration data into a training set and a validation set

310
Train the model using the training set to produce a set of configuration rules

330
Compute one or more prediction threshold values

332
Provide the one or more prediction threshold values

340
Generate the set of rules using the one or more prediction threshold values

350
Provide the set of configuration rules

511 – Rule Name

512 – Rule Description

513 – Rule Creator

514 – Rule Enforcer

515 – Plurality of entity attributes (query)

516 – One or more target entity entitlements (grants)

517 – Rule model properties

518 – Rule metrics

GENERATING CONFIGURATION RULES USING MACHINE LEARNING

BACKGROUND

Some embodiments described in the present disclosure relate to an asset management system and, more specifically, but not exclusively, to an identity management system.

As used herein, the term "user" refers to an actor within a computerized system of an organization, for example an enterprise organization. A user may be a human user, for example an employee of the organization. Some other examples of a user include a contractor and a customer. A user may be a computerized agent, for example a software program, for example a management application.

In the field of Information Technologies (IT), the term "asset management" refers to the systematic process of tracking, managing, maintaining, and optimizing an organization's IT assets throughout their lifecycle. This includes both physical assets like hardware (some examples include servers, laptops, mobile devices, storage devices and network devices) and digital assets such as software applications, software services, licenses, and data, for example digital data identifying and describing a user. Within the realm of asset management, the term "identity management" refers to ensuring that the right users have the correct permissions to access specific IT assets based on their roles within the organization. For example, when an employee of an organization is issued a laptop or granted access to a cloud application, identity management controls authentication, i.e. verifying the employee's identity, and authorization, determining what the user can do with the asset (i.e. the laptop or cloud application). In another example, when an employee changes roles or leaves the organization, identity management ensures that access to some assets is updated or revoked in a timely manner.

Identity management is a crucial component of modern computerized systems, managing entitlements of entities such as users, physical devices, or applications. These entitlements typically include access permissions to various resources, role assignments, and group memberships. Traditionally, the configuration of such systems has been a manual process. There is a growing use of identity management systems that control access permissions to applications and resources, as well as role assignments within an organization. As used herein, the term management domain refers to a distinct area of IT asset management, typically associated with a specific tool, system, or set of processes that handles a particular aspect of asset information and control. A management domain has an identified scope of assets it manages or monitors. The scope of assets a management domain manages may be based on, for example, asset type (e.g., hardware, software, user accounts), organizational division (e.g., department, geographical location), or functional area (e.g., security, inventory, performance). The scope may be based on a combination of criteria. In today's complex IT environments, organizations often operate multiple management domains, each with its own set of rules, formats, and management tools. Some examples of a management domain are Microsoft Active Directory, AWS, VmWare ESXi, and McAfec ePO.

SUMMARY

It is an object of some embodiments described in the present disclosure to provide a system and method for configuring access control in a computerized system by generating configuration rules for the computerized system using machine learning techniques. The solution analyzes existing configuration data, including entity attributes and current entitlements, to train a machine-learning model that can predict appropriate entitlements based on entity characteristics.

The foregoing and other objects are achieved by the features of the independent claims. Further implementation forms are apparent from the dependent claims, the description and the figures.

According to a first aspect, a method for configuring access control in a computerized system comprises: generating at least one configuration rule, comprising: providing digital data comprising a set of configuration data of the computerized system to a machine-learning model trained to generate a set of configuration rules in response to the set of configuration data, each of the set of configuration rules comprising a plurality of entity attributes of at least one entity of a plurality of entities of the computerized system and at least one target entity entitlement, to generate the at least one configuration rule; adding to each of the at least one configuration rule at least one rule metric value indicative of a quality of the rule; applying the at least one configuration rule to other digital data comprising another plurality of entity attributes of at least one other entity of the plurality of entities, to generate at least one entity entitlement; and controlling access of the at least one other entity to the computerized system by modifying, by at least one configuration software object, at least one system configuration value of the computerized system according to at least one configuration instruction generated using the at least one entity entitlement.

Configuring a computerized system with a new configuration produced using a rule generated by a machine-learning model trained with an existing configuration of the computerized system ensures the configuration is consistent with the existing configuration, increasing stability of the computerized system, as well as increasing the computerized system's security. Adding to each rule of the set of configuration rules one or more rule metric scores increases usability of the set of configuration rules to an IT professional, for example allowing the IT professional to filter the set of rules and analyze the set of rules.

According to a second aspect, a system for configuring access control in a computerized system, comprises at least one hardware processor configured to: generate at least one configuration rule, comprising: providing digital data comprising a set of configuration data of the computerized system to a machine-learning model trained to generate a set of configuration rules in response to the set of configuration data, each of the set of configuration rules comprising a plurality of entity attributes of at least one entity of a plurality of entities of the computerized system and at least one target entity entitlement, to generate the at least one configuration rule; and adding to each of the at least one configuration rule at least one rule metric value indicative of a quality of the rule; apply the at least one configuration rule to other digital data comprising another plurality of entity attributes of at least one other entity of a plurality of entities, to generate at least one entity entitlement; and control access of the at least one other entity to the computerized system by modifying, by at least one configuration software object, at least one system configuration value of the computerized system according to at least one configuration instruction generated using the at least one entity entitlement.

According to a third aspect, a software program product for configuring access control in a computerized system comprises: a non-transitory computer readable storage medium; first program instructions for generating at least one configuration rule, comprising: providing digital data comprising a set of configuration data of the computerized system to a machine-learning model trained to generate a set of configuration rules in response to the set of configuration data, each of the set of configuration rules comprising a plurality of entity attributes of at least one entity of a plurality of entities of the computerized system and at least one target entity entitlement, to generate the at least one configuration rule; and adding to each of the at least one configuration rule at least one rule metric value indicative of a quality of the rule; second program instructions for applying the at least one configuration rule to other digital data comprising another plurality of entity attributes of at least one other entity of the plurality of entities, to generate at least one entity entitlement; and third program instructions for controlling access of the at least one other entity to the computerized system by modifying, by at least one configuration software object, at least one system configuration value of the computerized system according to at least one configuration instruction generated using the at least one entity entitlement; wherein the first, second, and third program instructions are executed by at least one computerized processor from the non-transitory computer readable storage medium.

According to a fourth aspect, a method for training a machine-learning model to generate a set of configuration rules for a computerized system comprises: in each of a plurality of training iterations, providing a machine-learning model digital training data comprising a set of configuration data of the computerized system, to produce a set of configuration rules, each of the set of configuration rules comprising a plurality of entity attributes of at least one entity of a plurality of entities of the computerized system and at least one target entity entitlement, to generate the at least one configuration rule; and providing the at least one configuration rule to at least one software object for computing one or more entity entitlements controlling access of one or more entities of the plurality of entities to the computerized system. Using digital data describing an existing configuration of a computerized system when training a machine-learning model to generate configuration rules for the system allows the configuration rules to reflect the existing configuration such that new entitlements allocated using the set of configuration rules are consistent with the existing configuration, increasing stability of the computerized system, as well as increasing the computerized system's security.

With reference to the first and second aspects, in a first possible implementation of the first and second aspects the plurality of entities comprises at least one of: a user, a user group, a user role, a user permission, a software application, a device of the computerized system, and a service. Optionally, each entity attribute of the plurality of entity attributes or of the other plurality of entity attributes comprises an entity attribute identifier and an entity attribute value. Optionally, an entity attribute value is one of: a user name value, a department identification value, a title value, an amount of years of experience, a role identification value, and an office identification value. Optionally, each entity entitlement of the at least one entity entitlement or the at least one target entity entitlement comprises an entitlement identifier and an entitlement value. Optionally, an entitlement value is one of: an application identification value, an application permission value, a group identification value, a role identification value, and an access permission value.

With reference to the first and second aspects, in a second possible implementation of the first and second aspects the set of configuration data comprises one or more of: a plurality of configured entity attributes of the plurality of entities of the computerized system; a plurality of configured entity entitlements of the computerized system; a plurality of user groups of the computerized system, a plurality of user roles of the computerized system; a plurality of access permissions of the computerized system; and a plurality of existing configuration rules of the computerized system. Optionally, the set of configuration data is generated by: accessing digital configuration data of the computerized system; extracting from the digital configuration data a plurality of configured entity attributes and a plurality of configured entity entitlements; and organizing the plurality of configured entity attributes and the plurality of configured entity entitlements into at least one multi-label matrix comprising a plurality of observations. Optionally, the set of configuration data is generated by at least one of: receiving from a domain management application of a management domain of the computerized system at least one set of digital records, each describing one of the plurality of entities in the management domain; retrieving from a repository of another management domain of the computerized system at least one other set of digital records, each describing another of the plurality of entities in the other management domain; and receiving from a scanning application, configured to scan the computerized system, at least one yet another set of digital records, each describing yet another of the plurality of entities. Organizing actual configuration data in one or more multi-label matrices allows training the machine-learning model to generate rules that provide more than one target entity entitlement in response to a set of entity attributes, reducing an amount of rules in the set of configuration rules compared to generating a separate rule for each possible target entitlement. A smaller set of configuration rules is easier to manage and understand and is more usable.

With reference to the first and second aspects, in a third possible implementation of the first and second aspects the at least one rule metric value is computed by: computing a set of predicted entity entitlements by providing the machine-learning model with validation digital data comprising a validation set of configuration data of the computerized system; and comparing the set of predicted entity entitlements to a validation set of configured entitlements of the computerized system. Optionally, the at least one rule metric value comprises at least one of: an accuracy score, a coverage score, and an impact score.

With reference to the first and second aspects, in a fourth possible implementation of the first and second aspects the machine-learning model is trained in a plurality of supervised training iterations using the set of configuration data.

With reference to the first and second aspects, in a fifth possible implementation of the first and second aspects modifying the at least one system configuration value according to at least one configuration instruction generated using the at least one entity entitlement comprises at least one of: sending the at least one configuration software object at least one configuration request; and modifying at least one configuration file of the computerized system. Optionally, the at least one configuration software object comprises a first configuration software object of a first domain management application of a first management domain and a second configuration software object of a second domain management application of a second management domain. Optionally the first management domain is different from the second management domain. Configuring more than one management domain of a computerized system using common one or more entity entitlements ensures consistency between the more than one management domains, increasing stability of the computerized system.

With reference to the first and second aspects, in a sixth possible implementation of the first and second aspects generating the at least one configuration rule further comprises additionally providing to the machine-learning model one or more prediction threshold values. Optionally, the machine-learning model generates the at least one configuration rule further using the one or more prediction threshold values. Optionally, the one or more prediction threshold values comprises: providing the configuration data to the machine-learning model to produce at least one entitlement probability value; and comparing the at least one entitlement probability value to at least one of the one or more prediction threshold values to produce the at least one target entity entitlement. Optionally, the one or more prediction threshold values are computed using at least one statistical value of the set of configuration rules.

With reference to the first and second aspects, in a seventh possible implementation of the first and second aspects generating the at least one configuration rule further comprises additionally providing to the machine-learning model an entity deletion indication.

With reference to the first and second aspects, in an eighth possible implementation of the first and second aspects the method further comprises: providing to the machine-learning model new digital data comprising a new plurality of entity attributes of a new entity, to generate at least one new entity entitlement.

With reference to the fourth aspect, in a first possible implementation of the fourth aspect the method further comprises: computing a set of predicted entity entitlements by providing the machine-learning model with validation digital data comprising a validation set of configuration data of the computerized system; computing at least one statistical value by comparing the set of predicted entity entitlements to a validation set of configured entitlements of the computerized system; and computing at least one prediction threshold value using the at least one statistical value and at least one business metric value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings.

With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 3 is a flowchart schematically representing an optional flow of operations for training a machine-learning model, according to some embodiments;

FIG. 5 is a schematic block diagram of an exemplary rule, according to some embodiments.

DETAILED DESCRIPTION

Figure 1:
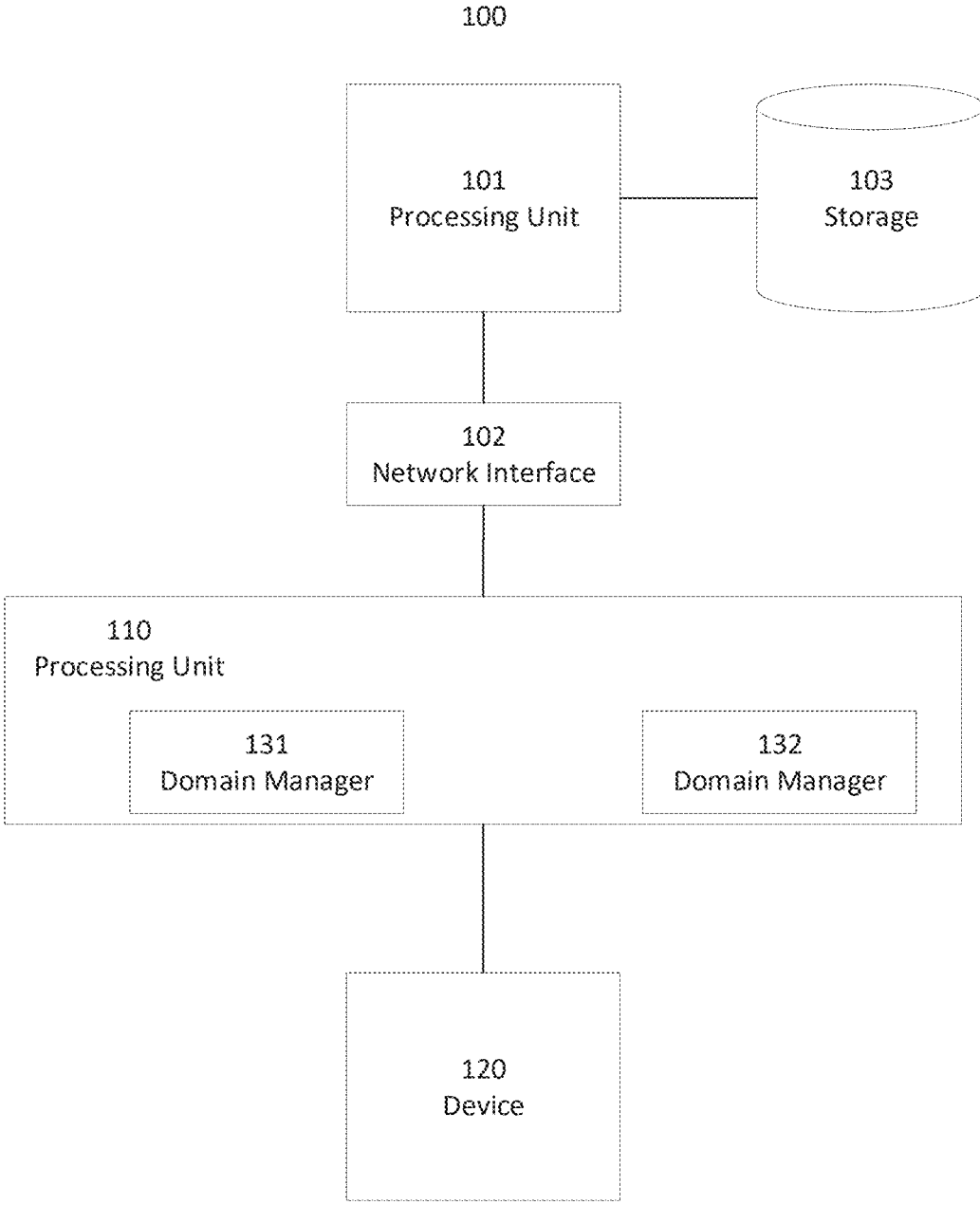
FIG. 1 is a schematic block diagram of an exemplary system, according to some embodiments.

As used herein, the terms "asset" and "entity" both refer to an organization's IT asset and the terms are used interchangeably.

A configuration rule is a formal statement or logical expression that defines conditions under which specific entitlements, permissions, or system configurations should be applied to entities within a computerized system, for example by an identity management system or an IT professional. A configuration rule typically consists of one or more conditions (an "if" part) and one or more actions or outcomes (a "then" part). A condition is typically based on entity attributes of an asset of the computerized system and an action typically involves granting one or more entitlements to the entity or setting configuration parameters of the computerized system.

While the following description focuses on aspects related to identity management of IT assets, it should be noted that the methods and systems described in this disclosure have broader applicability. The core concepts and techniques of rule optimization can be applied to any system that uses rules to govern the management of assets, whether those assets are digital or physical. Some examples of additional fields in which systems and methods described in the instant disclosure could be applied include the field of supply chain management, for example for rules that govern inventory levels, reorder points, and supplier selection across multiple warehouses or distribution centers, the field of manufacturing systems, for example for rules that control production schedules, quality control processes, and resource allocation across different production lines or facilities, the field of financial systems, for example for rules that manage risk assessment, credit approval, and fraud detection across various financial products or geographical regions, in the field of healthcare systems, for example for rules for patient care management, resource allocation, and regulatory compliance across different departments or healthcare facilities, and in the field of physical security systems, for example for access control rules for physical locations, integrating rules from different security domains (e.g., building access, restricted areas, time-based restrictions).

For brevity, unless otherwise noted henceforth the term "rule" is used to mean "configuration rule", and the terms are used interchangeably. In addition, as used herein the term "IT professional" refers to an individual who possesses the skill to work with computer systems, software, networks, and other technology-related infrastructure.

The traditional approach of manually configuring an organization's computerized system has several limitations, beyond merely being time-consuming. An organization's computerized system's existing configuration often embodies years of organizational knowledge and decision-making that may not be formally documented, where some knowledge might only exist in the minds of individual staff members of the organization. Different administrators might make inconsistent decisions based on their individual interpretations or knowledge. In addition, many computerized systems are managed across different domains or departments, leading to inconsistent configurations.

Configuration rules provide a standardized framework for decision-making, ensuring that similar situations are handled consistently across the organization, regardless of who is performing the configuration. A set of configuration rules may be used by an IT professional manually, and additionally or alternatively may be provided to an identity management system to reduce the amount of manual labor needed to configure a computerized system and further increase consistency in the computerized system's configuration. However, whether for use by an automated identity management system or by an IT professional configuring the computerized system, while there is a need to capture explicit and implicit knowledge that governs the computerized system's configuration in a comprehensive set of configuration rules, creating such a set of rules for an existing system is a challenge. Large-scale computerized systems often have thousands of entities and configurations. Manually analyzing and summarizing these into coherent rules is extremely time-consuming and prone to oversights. Complex relationships between entity attributes and their entitlements may not be immediately apparent, and humans might miss subtle patterns that exist across large datasets of configuration information. There is a need to efficiently and accurately generate configuration rules for identity management in complex, dynamic computerized environments. There is a need to identify complex, non-obvious relationships between entity attributes and appropriate entitlements across large datasets and multiple management domains. While simple access control rules could potentially be created manually, the sheer volume of configuration data in large-scale systems with numerous entities, attributes, and entitlements and the complexity of relationships make it impractical, if not impossible, for a human mind to process effectively.

Introducing automation into the process of generating configuration rules for an existing system not only helps reduce the amount of time required to generate a set of configuration rules but helps dealing with the complexity of the amount of configuration data of a large-scale computerized system. A possible solution is to use one or more static analysis methods, for example statistical analysis, to analyze configuration data of the computerized system and generate the set of configuration rules based on such an analysis. While such static analysis methods can reveal strong correlations and trends they tend to work well with numerical data and may miss complex, non-linear relationships. Pattern matching algorithms, designed to find recurring patterns in configuration data, may identify common configurations but may struggle with subtle or context-dependent patterns.

To overcome these limitations, some embodiments described in the present disclosure use a machine-learning model to generate a set of configuration rules for a computerized system, where the machine-learning model is trained using configuration data of the computerized system. For brevity, henceforth the term "model" is used to mean "machine-learning model" and the terms are used interchangeably.

An entity, having a plurality of entity attributes, may be assigned multiple entitlements. A multi-label or multi-output approach in machine learning refers to a type of supervised learning problem where each instance in the dataset can be associated with multiple target variables or labels simultaneously. The present disclosure, in some embodiments described herein, proposes configuring access control in a computerized system by applying one or more configuration rules to a set of entity attributes to produce one or more entity entitlements and then configure the computerized system according to the one or more entity entitlements, where the one or more configuration rules are produced by a machine-learning model trained to generate a set of configuration rules. Optionally, the set of configuration rules is generated by providing the trained machine-learning model a set of configuration data of the computerized system. Optionally, the one or more configuration rules are at least part of the set of configuration rules. Optionally, each of the set of configuration rules comprises a plurality of entity attributes of one or more entities of a plurality of entities of the computerized system and one or more target entity entitlements of a plurality of entity entitlements of the computerized system. Generating the set of configuration rules by providing the trained model with a set of configuration data of the computerized system results in the set of rules reflecting policies and configuration practices of the computerized system, ensuring that the one or more target entity entitlements generated using one or more of the set of configuration rules is in line with these policies and configuration practices.

Optionally, one or more rule metric values are added to each rule of the one or more configuration rules where a rule metric value is indicative of, i.e. reflects, a quality of the rule to which it is added. Optionally, a rule metric value is an accuracy score, reflecting how accurately a rule predicts one or more entity entitlement for a given set of entity attribute values. An accuracy score may be computed as an average of a set of probabilities of a set of entitlements predicted by the rule. Optionally, a rule metric value is a coverage score, reflecting an amount of assets of the computerized system that currently have the plurality of entity attributes and the one or more target entity entitlements of the rule. Optionally, a rule metric value is an impact score, reflecting another amount of assets of the computerized system that have the plurality of entity attributes of the rule but not the one or more target entity entitlements, and thus applying the rule could affect them.

Optionally, the machine-learning model is trained to generate a set of configuration rules in response to the set of configuration data in a plurality of iterations, where in each of the plurality of iterations a training set of configuration data that is at least a subset of the set of configuration data is provided to the machine-learning model. Optionally, the set of configuration data comprises a plurality of configured entity attributes and a plurality of configured entity entitlements extracted from digital configuration data of the computerized system. Optionally, the plurality of entity attributes and the plurality of configured entity entitlements are organized in the set of configuration data into one or more multi-label matrices comprising a plurality of observations. For example, a first plurality of observations may include for each asset of the plurality of assets of the computerized system a respective plurality of configured entity attributes of the asset and a first matrix may comprise the first plurality of observations. Further in the example, a second plurality of observations may include for each asset of the plurality of assets of the computerized system a respective plurality of configured entity entitlements of the asset and a second matrix may comprise the second plurality of observations. Organizing configuration data of the computerized system in one or more multi-label matrices allows training the machine-learning model using a multi-label approach, which allows the model to predict multiple entitlements for each entity simultaneously, capturing the complex relationships between entity attributes and the various permissions or access rights they might need. Furthermore, training the machine-learning model with the one or more multi-label matrices allows training the machine-learning model to produce a set of configuration rules pertaining to the plurality of entities of the computerized system, and not just a single rule pertaining to one set of entity attributes.

In addition, to increase accuracy of the generated set of rules, in some embodiments the present disclosure proposes to further add to the model one or more prediction threshold values, and to generate the set of configuration rules using the one or more prediction threshold values. In such embodiments the model generates for each rule, in response to the configuration data, one or more entitlement probability values. Optionally, the one or more target entity entitlements of a rule are produced by comparing the one or more entitlement probability values to the one or more prediction threshold values. Using a prediction probability threshold increases accuracy of a target entity entitlement, guaranteeing the target entity entitlement is granted only when a predicted probability of the entitlement exceeds the prediction probability threshold. Optionally, each of the one or more prediction threshold values is associated with one of the plurality of entity entitlements of the computerized system. Optionally, different entity entitlements are associated with different prediction threshold values.

Optionally, the model is validated using a validation set of configuration data. Optionally, the validation set of configuration data is at least another subset of the set of configuration data of the computerized system. Optionally the training set of configuration data and the validation set of configuration data are disjoint. Optionally, validating the model includes computing a set of predicted entity entitlements by providing the model with validation digital data comprising the validation set of configuration data. Optionally, the one or more prediction threshold values are computed using one or more statistical values of the set of configuration rules. Optionally, computing one or more statistical values comprises comparing the validation set of configured entitlements of the validation set of configuration data to the set of predicted entity entitlements. Optionally, computing the plurality of prediction threshold values comprises using one or more business metric values that reflect business requirements of the computerized system. For example, for a first of the plurality of entity entitlements there may be a need for rules to have a higher precision than for a second of the plurality of entity entitlements, and thus a first prediction threshold value for the first entity entitlement may be higher than a second prediction threshold value for a second entity entitlement.

A machine-learning model trained as described can identify non-obvious relationships and patterns in the existing configuration data that human administrators might overlook. This can lead to more nuanced and effective entitlement assignment. By basing the set of configuration rules on actual system configurations, the generated rules reflect the real-world usage patterns and relationships that exist in the computerized systems. This leads to more accurate and relevant entitlement policies compared to rules created based on theoretical assumptions or generic best practices, such that future configurations made based on the set of configuration rules are consistent with the existing usage patterns and relationships of the computerized system. This also allows predicting one or more entitlements that should be assigned to an asset, without actually configuring the system. Computing the one or more prediction threshold values, each for one of a plurality of entity entitlements of the computerized system, using the one or more statistical values of the set of configuration rules increases accuracy of the predicted one or more target entity entitlements and thus increases consistency, stability and security of the configuration of the computerized system. Computing the plurality of statistic values by comparing the validation set of configured entitlements to the set of predicted entity entitlements computed by the model increases the accuracy of the one or more prediction threshold values in reflecting the real-world configuration, thus increasing the accuracy of the one or more target entity entitlements of the rule and by that increasing the accuracy of the one or more entity entitlements computed using the rule.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, both the terms "domain manager" and "domain management application" refer to a tool or a set of tools for managing a plurality of assets of the computerized system in a management domain and the terms are used interchangeably. For brevity, henceforth the term "domain" is used to mean "management domain" and the terms are used interchangeably.

Reference is now made to FIG. 1, showing a schematic block diagram of an exemplary system 100, according to some embodiments. In such embodiments, system 100 comprises processing unit 101. A processing unit may be any kind of programmable or non-programmable circuitry that is configured to carry out the operations described herein. The processing unit may comprise hardware as well as software. For example, the processing unit may comprise one or more hardware processors and a transitory or non-transitory memory that carries a program which causes the processing unit to perform the respective operations when the program is executed by the one or more hardware processors.

Optionally, system 100 comprises one or more management domains managed by one or more domain managers. In this example, the one or more domain managers comprises domain manager 131 managing a first domain of the one or more management domains and domain manager 132 managing a second domain of the one or more management domains. Optionally, at least one of domain manger 131 and domain manager 132 is executed by processing unit 101. Optionally, processing unit 101 is connected to other processing unit 110, optionally via one or more digital communication network interface 102. Optionally, at least one other of at least one of domain manger 131 and domain manager 132 is executed by other processing unit 110.

For brevity, henceforth the term "network interface" is used to mean "one or more digital communication network interface" and the terms are used interchangeably. Optionally, network interface 103 is connected to a local area network (LAN), for example an Ethernet network or a Wi-Fi network. Optionally, network interface 102 is connected to a wide area network (WAN), for example a cellular network or the Internet.

Optionally, processing unit 101 is connected to one or more non-volatile digital storage 103, optionally for storing one or more sets of configuration rules and additionally or alternatively for storing digital configuration data. For brevity, henceforth the term "storage" is used to mean "one or more non-volatile digital storage" and the terms are used interchangeably. Some examples of a digital storage include a hard disk drive, a solid state drive (SSD), a network connected storage and a storage network. Optionally storage 103 is electrically connected to processing unit 101, for example when storage 103 is a hard disk drive or a solid state drive. Optionally, storage 103 is connected to processing unit 101 via network interface 102, for example when storage 103 is a storage network or a network attached storage.

Optionally, system 100 comprises one or more devices 120. Some examples of a device include, but are not limited to, a computer, a server, a laptop computer, a mobile device, a storage device and a network device, for example a router. Optionally, each of one or more devices 120 is connected to at least one of domain manager 131 and domain manager 132, optionally via network interface 102.

Optionally, at least one of domain manager 131 and domain manager 132 manages a plurality of software entities of system 100, for example one or more users of system 100. Other examples include one or more software applications executed by at least one of one or more devices 120 or by processing unit 101.

To configure computerized system 100, in some embodiments system 100 implements the following optional method.

Figure 2:
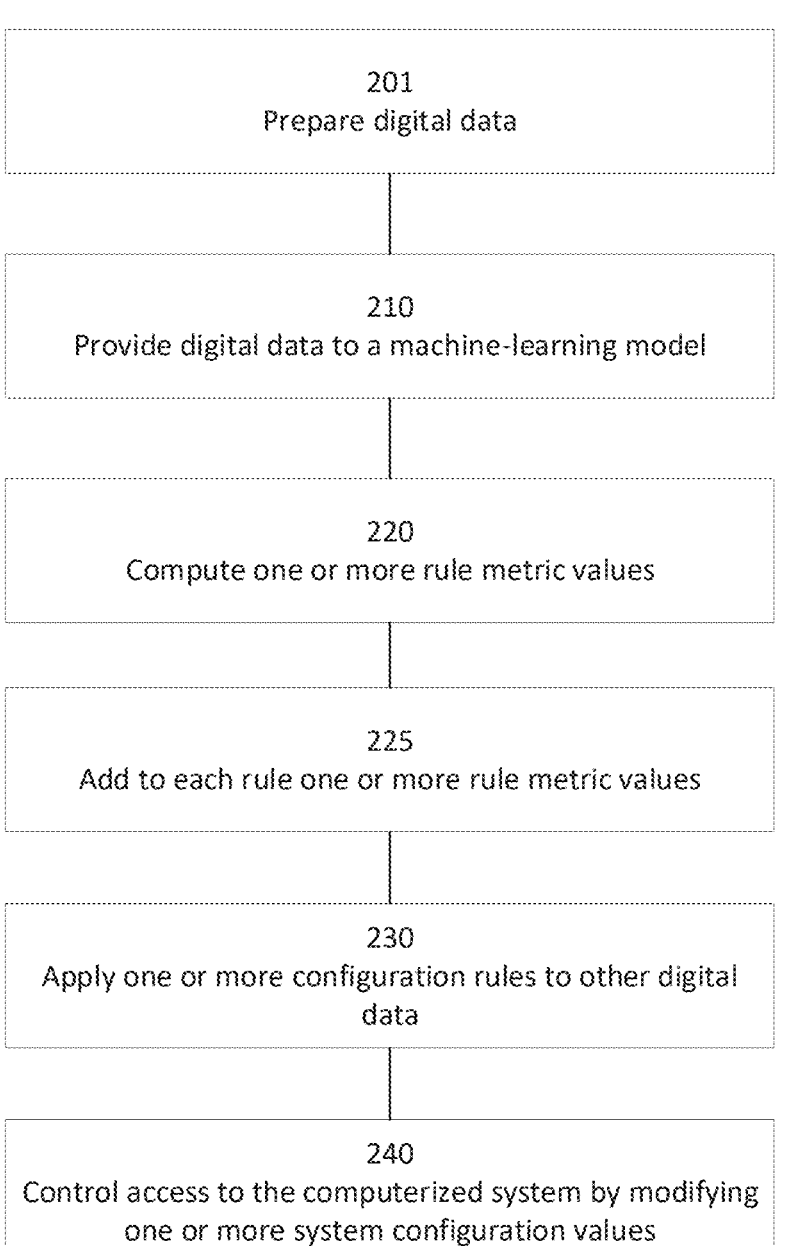
FIG. 2 is a flowchart schematically representing an optional flow of operations for configuring access control, according to some embodiments.

Reference is now made also to FIG. 2, showing a flowchart schematically representing an optional flow of operations 200 for configuring access control, according to some embodiments. In such embodiments, in 210 processing unit 101 provides a machine-learning model with digital data comprising a set of configuration data. Optionally, processing unit 101 generates the set of configuration data by receiving from domain manager 131, each describing one of a plurality of entities of system 100, for example entities that are managed by domain manager 131 in a management domain. Optionally, processing unit 101 generates the set of configuration data by retrieving from a repository of domain manager 132 one or more other sets of records, each describing another of the plurality of entities of system 100, for example entities that are managed by domain manager 132 in another management domain. Optionally, processing unit 101 generates the set of configuration data by receiving from a scanning application, configured to scan system 100, one or more yet other sets of digital records, each describing yet another of the plurality of entities of system 100. Some examples of an entity include, but are not limited to, a user, a user group, a user role, a user permission, a software application, a device of system 100, and a service. A software application may be a database access or management tool. Another example of a software application is a system management tool. A service may be provided over a digital communication network, for example Google Docs. A user permission is a specific authorization that allows a user to perform a particular action, some examples including "read a file," "edit a document," or "delete an account."

Optionally, the model is trained to generate a set of configuration rules in response to the set of configuration data.

Figure 4:
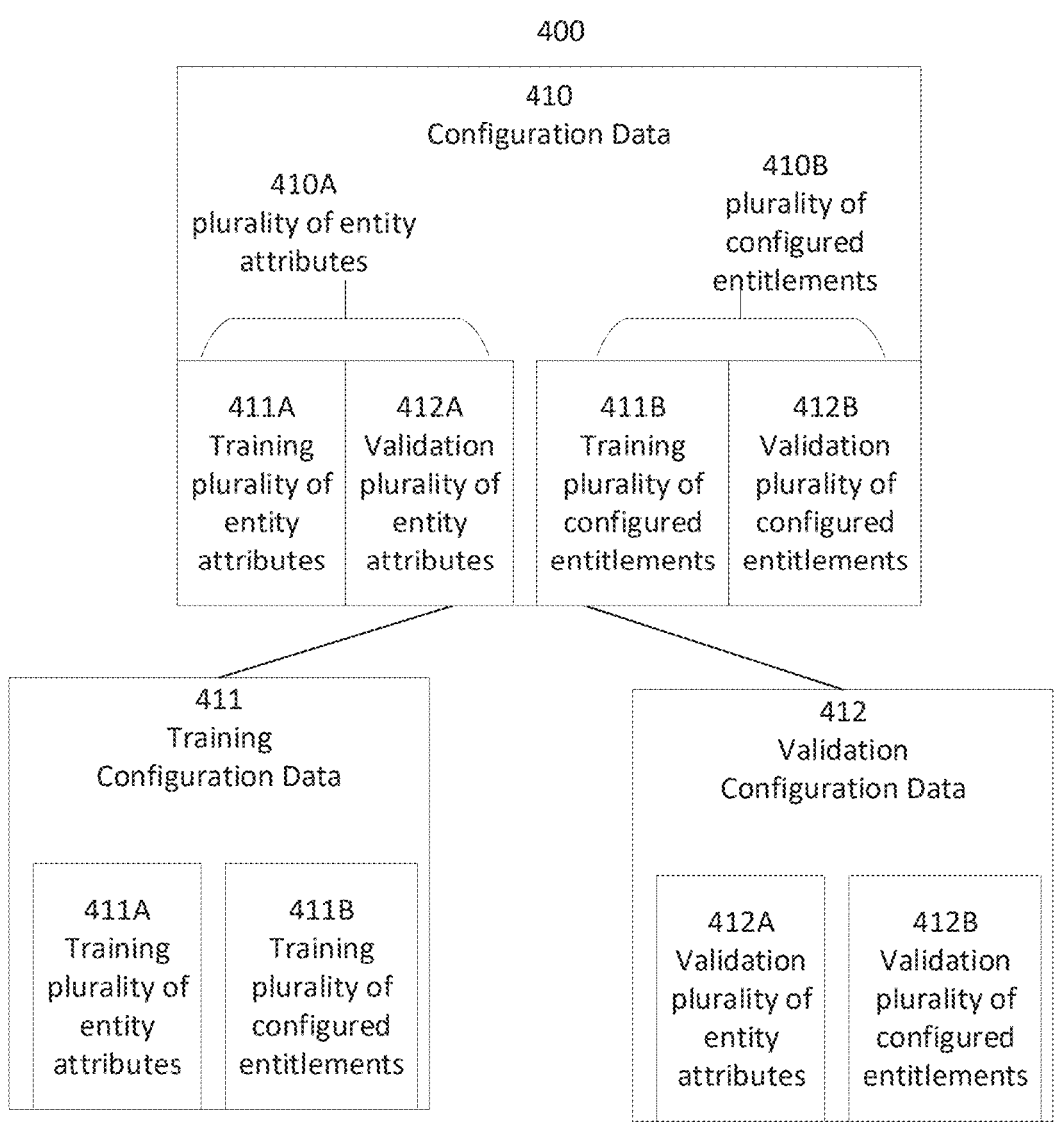
FIG. 4 is a schematic block diagram of exemplary digital configuration data, according to some embodiments.

Reference is now made also to FIG. 3, showing a flowchart schematically representing an optional flow of operations 300 for training a machine-learning model, according to some embodiments. Optionally, to train the model, in 301 processing unit 101 accesses digital configuration data of system 100, for example by generating a set of configuration data as described above. Reference is now made also to FIG. 4, showing a schematic block diagram of exemplary digital configuration data 400, according to some embodiments. In such embodiments, digital configuration data 400 comprises set of configuration data 410. Optionally, set of configuration data 410 comprises a plurality of entity attributes 410A and a plurality of entity entitlements 410B. Optionally, an entity attribute comprises an entity attribute identifier and an entity attribute value. Some examples of an entity attribute value include, but are not limited to, a user name value, a department identifier value, a title value, an amount of years of experience, a role identification value and an office identification value. Optionally, an entity entitlement comprises an entitlement identifier and an entitlement value. Some examples of an entitlement value include, but are not limited to, an application identification value, an application permission value, a group identification value, a role identification value and an access permission value.

Optionally, the plurality of entity attributes 410A is a plurality of configured entity attributes of the plurality of entities of system 100. Optionally, the plurality of entity entitlements 410A is a plurality of configured entity entitlements of the plurality of entities of system 100. Optionally, set of configuration data 410 comprises a plurality of user groups of system 100. Optionally, set of configuration data 410 comprises a plurality of user roles of system 100. Optionally, set of configuration data 410 comprises a plurality of access permissions of system 100. Optionally, set of configuration data 410 comprises a plurality of existing configuration rules of system 100. Optionally, the plurality of existing configuration rules comprise at least one rule generated by domain manager 131 or domain manager 132. Optionally, the plurality of existing configuration rules comprise at least one other rule generated manually by an IT professional of system 100. Optionally, at least one yet other rule of plurality of existing configuration rules is formatted to a standard format. Optionally, the model generates the set of configuration rules by augmenting the plurality of existing configuration rules.

Reference is now made again to FIG. 3. Optionally, in 302 processing unit 101 extracts from set of configuration data 410 the plurality of configured entity attributes 410A and the plurality of configured entity entitlements 410B. Optionally, in 304 processing unit 101 organizes the plurality of configured entity attributes and the plurality of configured entity entitlements into one or more multi-label matrices. Optionally, each of the one or more multi-label matrices comprises a plurality of observations. Optionally, a first observation comprises a plurality of configured entity attributes of an asset. Optionally, one of the one or more multi-label matrices comprises a plurality of first observations. Optionally, a second observation comprises a plurality of configured entity entitlements of an asset. Optionally, another of the one or more multi-label matrices comprises a plurality of second observations, optionally for use as labels in a multi-label/multi-output supervised training session of the model.

Optionally, in 307 processing unit 101 divides the set of configuration data 410 into a training set of configuration data and a validation set of configuration data. Reference is now made again to FIG. 4. In 307, processing unit 101 optionally divides the set of configuration data 410 into training set of configuration data 411 and validation set of configuration data 412. Optionally, training set of configuration data 411 and validation set of configuration data 412 are disjoint. Optionally, in 307 processing unit divides plurality of entity attributes 410A into training plurality of entity attributes 411A and validation plurality of entity attributes 412A such that training plurality of configuration data 411 comprises training plurality of entity attributes 411A and validation plurality of configuration data 412 comprises validation plurality of entity attributes 412A. Optionally, in 307 processing unit divides plurality of entity entitlements 410B into training plurality of entity entitlements 411B and validation plurality of entity attributes 412B such that training plurality of configuration data 411 comprises training plurality of entity entitlements 411B and validation plurality of configuration data 412 comprises validation plurality of entity entitlements 412B. Optionally, the set of configuration data 410 into training set of configuration data 411 and validation set of configuration data 412 according to an identified ratio between a size of training set of configuration data 411 and set of configuration data 410. For example, training set of configuration data 411 may be 80 percent of set of configuration data 410. Optionally, the ratio is in the range of 10 percent to 90 percent.

Reference is now made again to FIG. 3. In 310, processing unit 101 optionally trains the machine-learning model using the set of configuration data 410, for example by using training set of configuration data 411. Optionally, processing unit 101 trains the model in a plurality of training iterations. Optionally, the plurality of training iterations are a plurality of supervised training iterations. Optionally, in each of the plurality of training iterations processing unit 101 provides the model with at least part of the set of configuration data 410, for example the training set of configuration data 411. Optionally, the model is trained to produce a set of configuration rules in response to digital data comprising a plurality of entity attributes.

Reference is now made also to FIG. 5, showing a schematic block diagram of an exemplary rule 500, according to some embodiments. Optionally, each rule of the set of configuration rules comprises rule name 511. Optionally, each rule of the set of configuration rules comprises rule description 512. Optionally, each rule of the set of configuration rules comprises rule creator 513. A rule creator may be a domain manager identifier. Other examples of a rule creator include an identifier of an IT professional for a manually created rule and a rule generation tool, for example a rule generator implemented according to the present disclosure. Optionally, each rule of the set of configuration rules comprises a plurality of entity attributes 515 (which serve as a query, or an "if" clause of the rule). Optionally, each rule of the set of configuration rules comprises one or more target entity entitlements 516 (which serve as grants, or a "then" clause of the rule). Optionally, each rule of the set of configuration rules comprises one or more machine-learning model rule properties 517, for example a rule score of the rule computed by the machine-learning model. Another example of a machine-learning model rule property is a scope of the rule, for example a domain to which the rule pertains. Optionally, each rule of the set of configuration rules comprises one or more rule metric values, each reflective of a quality of the rule.

Reference is now made again to FIG. 3. In 330, processing unit 101 optionally computes one or more prediction threshold values. Optionally, each prediction threshold value of the one or more prediction threshold values is computed for one of a plurality of entitlements of system 100.

Figure 6:
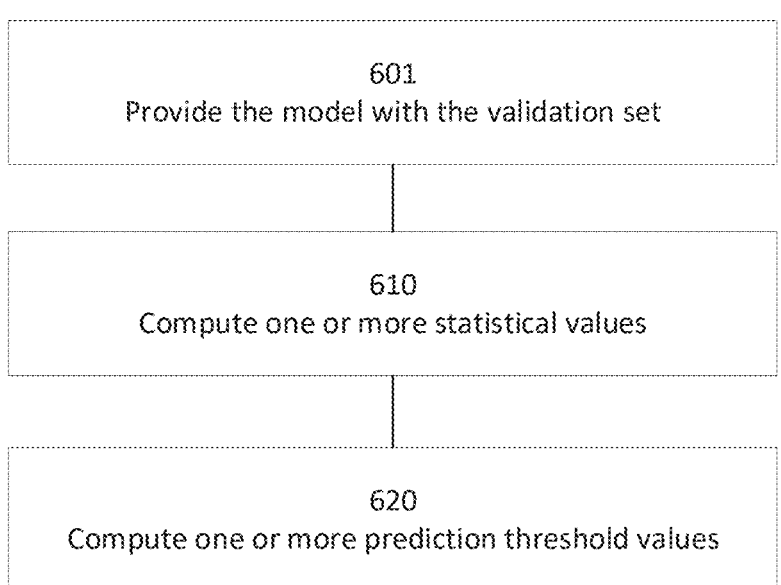
FIG. 6 is a flowchart schematically representing an optional flow of operations for computing prediction threshold values, according to some embodiments.

Reference is now made also to FIG. 6, showing a flowchart schematically representing an optional flow of operations 600 for computing prediction threshold values, according to some embodiments. In 601, processing unit 101 optionally provides the model with validation digital data. Optionally, the validation digital data comprises validation set of configuration data 412. Optionally, processing unit 101 provides the model with the validation plurality of configured entity attributes 412B. Optionally, the model comprises a set of predicted entity entitlements in response to the validation plurality of configured entity attributes 412B. In 610, processing unit 101 optionally computes one or more statistical values by comparing the set of predicted entity entitlements to validation set of configured entitlements 412B. Optionally, in 620 processing unit 101 uses the one or more statistical values and one or more business metric values to compute the one or more threshold values. For example, processing unit 101 may compute a prediction threshold value for an entity entitlement such that a distribution of a plurality of entity entitlement values of the entity entitlement in the set of predicted entity entitlements fulfils the one or more business metric values, for example a degree of precision of the entity entitlement in the set of predicted entity entitlements.

Reference is now made again to FIG. 3. In 332, processing unit 101 optionally provides the one or more prediction threshold values to the machine-learning model. Optionally, in 340, the model generates the set of configuration rules using the one or more prediction threshold values. Optionally, in 210 the model computes one or more entitlement probability values in response to the configuration data. Optionally, using the one or more prediction threshold values to produce the one or more target entity entitlements comprises comparing the one or more entitlement probability values to at least one of the one or more prediction threshold values.

For example, in response to input comprising a plurality of entity attributes the model may compute a plurality of entity entitlement probabilities and optionally compute the one or more entity entitlements by comparing the plurality of entity entitlement probabilities to the one or more prediction threshold values. Optionally, the model adds an entity entitlement to a rule as a target entity entitlement subject to an entity entitlement probability computed for the entity entitlement exceeding a prediction threshold value computed for the entity entitlement.

In 350, processing unit 101 optionally provides one or more rules of the set of configuration rules to one or more software objects. Optionally, the one or more software objects are executed by processing unit 101. Optionally the one or more software objects are at least part of a domain manager, for example domain manager 131. Optionally, the one or more software objects compute one or more entity entitlements controlling access of one or more entities of the plurality of entities to system 100, optionally using the one or more rules. Optionally, processing unit 101 provides the one or more rules via network interface 102. Optionally, processing unit 101 provides the one or more rules by storing the one or more rules on storage 103.

Reference is now made again to FIG. 2.

Optionally, generating the one or more configuration rules comprises additionally providing to the model an entity deletion indication. Optionally, applying a rule generated in response to an entity deletion indication results in revoking one or more entitlements.

Optionally, in 225 processing unit 101 adds to each of the set of rules generated by the model one or more rule metric values. Optionally, a rule metric value is an accuracy score.

Optionally, a rule metric value is a coverage score. Optionally, a rule metric value is an impact score.

Optionally, in 220, processing unit 101 computes the one or more rule metric values to add to each of the rules. Optionally, processing unit 101 computes the one or more rule metric values by computing a set of predicted entity entitlements, optionally by providing the model with validation digital data comprising validation set of configuration data 410B. Optionally, processing unit 101 compares the set of predicted entity entitlements to the validation plurality of configured entitlements 412B.

Optionally, in 201, processing unit 101 prepares the digital data. For example, processing unit 101 may organize the digital data in one or more multi-label matrices, similar to organization of data for training in 304. Optionally, processing unit 101 applies one or more filters to the set of configuration data, for example to remove duplicate observations. Optionally, processing unit creates a set of user profiles, each created according to a subset of entity attribute, for example "only developers" or "most frequent attribute combinations". Optionally, in 210, processing unit 101 provides as the digital data the set of user profiles.

In 230, processing unit 230 optionally uses one or more configuration rules of the set of configuration rules to generate one or more entity entitlements. To do so, processing unit 101 optionally applies the one or more configuration rules to another plurality of entity attributes one or more other entities of the plurality of entities of system 100.

In 240, processing unit 101 optionally uses the one or more entity entitlements to control access of the one or more other entities to system 100. Optionally, processing unit 101 control the access by modifying one or more system configuration values of system 100 according to one or more configuration instructions generated using the one or more entity entitlements. Optionally, at least one of the one or more system configuration values is on at least one of one or more devices 120. Optionally, at least one of the one or more system configuration values is stored in storage 103. Optionally, processing unit 101 modifies the one or more configuration values by one or more configuration software objects, optionally executed by processing unit 101, optionally executed by other processing unit 110. Optionally, modifying the one or more system configuration values comprises processing unit 101 sending one or more configuration requests to the one or more configuration software objects. Optionally, modifying the one or more system configuration values comprises modifying one or more configuration files of system 100.

Optionally, the one or more entity entitlements are related to more than one domain of the one or more domains of system 100. Optionally, the one or more software configuration objects comprises a first configuration software object of domain manager 131 managing the first domain and a second configuration software object of domain manager 132 managing the second domain, where the first domain is different from the second domain.

Additionally or alternatively to generating the set of configuration rules, the model may be used to predict one or more expected entitlements for a new entity that is not part of system 100. To do so, processing unit 101 optionally provides the model with new digital data comprising a new plurality of entity attributes of a new entity. Optionally, the model generates one or more new entity entitlements in response to the new digital data. Optionally, the one or more new entity entitlements are provided to an IT professional, for example for review.

As described above, the solution described in the present disclosure may be applied in fields other than identity management. In each of the contexts mentioned above, the present solution's ability to automatically generate rules by analyzing and learning from existing system configurations offers significant advantages. The core principles of the invention-using machine learning to identify patterns in entity attributes and associated permissions or allocations—can be adapted to various domains. The core machine learning approach is adaptable, allowing the system to be tailored to the specific needs and data structures of each domain. In all cases, the goal remains the same: to generate intelligent, data-driven rules that optimize system performance, enhance security, and improve resource allocation based on actual usage patterns and entity characteristics. As with identity management, implementing this solution in other fields could lead to significant improvements in efficiency, consistency, and adaptability of complex systems, while reducing the manual overhead traditionally associated with rule creation and management.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant entity attributes, entity entitlements, rule metric values and business metric values will be developed and the scope of the terms "entity attribute", "entity entitlement", "rule metric value" and "business metric value" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for training a machine-learning model to generate a set of configuration rules for a computerized system, comprising:
 organizing a set of configuration data of the computerized system into one or more multi-label matrices comprising a plurality of observations, where the one or more multi-label matrices comprise a first matrix and a second matrix, where the first matrix comprises a first plurality of observations comprising for each entity of a plurality of entities of the computerized system a respective plurality of configured entity attributes of the entity, and where the second matrix comprises a second plurality of observations comprising for each entity of the plurality of entities a respective plurality of configured entity entitlements of the entity, wherein the second matrix is for use as labels in a multi-label supervised training session of the machine-learning model;
 training a machine-learning model to produce a set of configuration rules by in each of a plurality of supervised training iterations, providing the machine-learning model digital training data comprising the set of configuration data organized into the one or more multi-label matrices, each of the set of configuration rules comprising a plurality of entity attributes of at least one entity of the plurality of entities and at least one target entity entitlement, to generate at least one configuration rule;
 providing the at least one configuration rule to at least one software object for computing one or more entity entitlements controlling access of one or more entities of the plurality of entities to the computerized system; and
 controlling access of the one or more entities to the computerized system by modifying, by at least one configuration software object, at least one system configuration value of the computerized system according to at least one configuration instruction generated using the one or more entity entitlements.

2. The method of claim 1, further comprising:
 computing a set of predicted entity entitlements by providing the machine-learning model with validation digital data comprising a validation set of configuration data of the computerized system;
 computing at least one statistical value by comparing the set of predicted entity entitlements to a validation set of configured entitlements of the computerized system; and
 computing at least one prediction threshold value using the at least one statistical value and at least one business metric value.

3. The method of claim 2, wherein the machine-learning model;
 generates the set of configuration rules further using the at least one prediction threshold value.

4. The method of claim 3, wherein using the prediction threshold values comprises:
 providing the configuration validation digital data to the machine-learning model to produce at least one entitlement probability value; and
 comparing the at least one entitlement probability value to the at least one prediction value to produce the set of predicted entity values.

5. The method of claim 3, wherein the at least one prediction threshold values are computed using at least one statistical value and at least one business metric value.

6. The method of claim 1, wherein the plurality of entities comprises at least one of: a user, a user group, a user role, a user permission, a software application, a device of the computerized system, and a service.

7. The method of claim 1, wherein each entity attribute of the plurality of entity attributes comprises an entity attribute identifier and an entity attribute value.

8. The method of claim 7, wherein an entity attribute value is one of: a user name value, a department identification value, a title value, an amount of years of experience, a role identification value, and an office identification value.

9. The method of claim 1, wherein each entity entitlement of the at least one entity entitlement comprises an entitlement identifier and an entitlement value.

10. The method of claim 9, wherein an entitlement value is one of: an application identification value, an application permission value, a group identification value, a role identification value, and an access permission value.

11. The method of claim 1, wherein the set of configuration data comprises one or more of:

a plurality of configured entity attributes of the plurality of entities of the computerized system;

a plurality of configured entity entitlements of the computerized system;

a plurality of user groups of the computerized system, a plurality of user roles of the computerized system;

a plurality of access permissions of the computerized system; and a plurality of existing configuration rules of the computerized system.

12. The method of claim 1, wherein the set of configuration data is generated by at least one of:

receiving from a domain management application of a management domain of the computerized system at least one set of digital records, each describing one of the plurality of entities in the management domain;

retrieving from a repository of another management domain of the computerized system at least one other set of digital records, each describing another of the plurality of entities in the other management domain; and receiving from a scanning application, configured to scan the computerized system, at least one yet another set of digital records, each describing yet another of the plurality of entities.

13. The method of claim 1, wherein modifying the at least one system configuration value according to at least one configuration instruction generated using the one or more entity entitlements comprises at least one of:

sending the at least one configuration software object at least one configuration request; and modifying at least one configuration file of the computerized system.

14. The method of claim 1, wherein the at least one configuration software object comprises a first configuration software object of a first domain management application of a first management domain and a second configuration software object of a second domain management application of a second management domain; and wherein the first management domain is different from the second management domain.

\* \* \* \* \*